(12) United States Patent
Tran (10) Patent No.: US 12,169,716 B2
(45) Date of Patent: *Dec. 17, 2024

(54) MICROPROCESSOR WITH A TIME COUNTER FOR STATICALLY DISPATCHING EXTENDED INSTRUCTIONS

(71) Applicant: Simplex Micro, Inc., San Jose, CA (US)

(72) Inventor: Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 313 days.

This patent is subject to a terminal disclaimer.

(21) Appl. No.: 17/725,476

(22) Filed: Apr. 20, 2022

(65) Prior Publication Data

US 2023/0342153 A1 Oct. 26, 2023

(51) Int. Cl.
*G06F 9/30* (2018.01)
*G06F 9/38* (2018.01)
*G06F 9/48* (2006.01)

(52) U.S. Cl.
CPC ...... *G06F 9/30181* (2013.01); *G06F 9/30145* (2013.01); *G06F 9/3838* (2013.01); *G06F 9/4843* (2013.01)

(58) Field of Classification Search
CPC .................. G06F 9/3836; G06F 9/30145
See application file for complete search history.

(56) References Cited

U.S. PATENT DOCUMENTS

| | | |
|---|---|---|
| 5,021,985 A | 6/1991 | Hu et al. |
| 5,185,868 A | 2/1993 | Tran |
| 5,251,306 A | 10/1993 | Tran |
| 5,655,096 A | 8/1997 | Branigin |
| 5,699,536 A | 12/1997 | Hopkins et al. |
| 5,799,163 A | 8/1998 | Park et al. |
| 5,802,386 A | 9/1998 | Kahle et al. |
| 5,809,268 A | 9/1998 | Chan |
| 5,835,745 A | 11/1998 | Sager et al. |
| 5,860,018 A | 1/1999 | Panwar |
| 5,881,302 A | 3/1999 | Omata |
| 5,903,919 A | 5/1999 | Myers |
| 5,958,041 A | 9/1999 | Petolino, Jr. et al. |
| 5,961,630 A | 10/1999 | Zaidi et al. |
| 5,964,867 A | 10/1999 | Anderson et al. |
| 5,996,061 A | 11/1999 | Lopez-Aguado et al. |
| 5,996,064 A | 11/1999 | Zaidi et al. |

(Continued)

FOREIGN PATENT DOCUMENTS

| | | | |
|---|---|---|---|
| EP | 0840213 A2 | 5/1998 |
| EP | 0902360 A2 | 3/1999 |

(Continued)

OTHER PUBLICATIONS

U.S. Pat. Appl. No. 17/588,315, filed on Jan. 30, 2022, by Thang Minh Tran

(Continued)

*Primary Examiner* — Zachary K Huson
(74) *Attorney, Agent, or Firm* — Appleton Luff (57) ABSTRACT

A processor includes a time counter and a register scoreboard and provides a method for statically dispatching custom or extended instructions with preset execution times based on a write time of a register in the register scoreboard and the time counter provided to an execution pipeline.

24 Claims, 6 Drawing Sheets

(56) References Cited

U.S. PATENT DOCUMENTS

| | | |
|---|---|---|
| 6,016,540 A | 1/2000 | Zaidi et al. |
| 6,035,393 A | 3/2000 | Glew et al. |
| 6,065,105 A | 5/2000 | Zaidi et al. |
| 6,247,113 B1 | 6/2001 | Jaggar |
| 6,282,634 B1 | 8/2001 | Hinds et al. |
| 6,304,955 B1 | 10/2001 | Arora |
| 6,425,090 B1 | 7/2002 | Arimilli et al. |
| 6,453,424 B1 | 9/2002 | Janniello |
| 7,069,425 B1 | 6/2006 | Takahashi |
| 7,434,032 B1 | 10/2008 | Coon et al. |
| 8,166,281 B2 | 4/2012 | Gschwind et al. |
| 9,256,428 B2 | 2/2016 | Heil et al. |
| 10,339,095 B2 | 7/2019 | Moudgill et al. |
| 11,062,200 B2 | 7/2021 | Lie et al. |
| 11,132,199 B1 | 9/2021 | Tran |
| 11,144,319 B1 | 10/2021 | Battle et al. |
| 11,163,582 B1 | 11/2021 | Tran |
| 11,204,770 B2 | 12/2021 | Tran |
| 11,263,013 B2 | 3/2022 | Tran |
| 11,467,841 B1 | 10/2022 | Tran |
| 11,829,187 B2 * | 11/2023 | Tran ............... G06F 9/3869 |
| 11,954,491 B2 | 4/2024 | Tran |
| 12,061,906 B2 | 8/2024 | Stephens et al. |
| 2001/0004755 A1 | 11/2001 | Levy et al. |
| 2003/0023646 A1 | 1/2003 | Lin et al. |
| 2003/0135712 A1 | 7/2003 | Theis |
| 2004/0073779 A1 | 4/2004 | Hokenek et al. |
| 2005/0251657 A1 | 11/2005 | Boucher |
| 2006/0010305 A1 | 1/2006 | Maeda et al. |
| 2006/0095732 A1 | 5/2006 | Tran et al. |
| 2006/0218124 A1 | 9/2006 | Williamson et al. |
| 2006/0259800 A1 | 11/2006 | Maejima |
| 2006/0288194 A1 * | 12/2006 | Lewis ............... G06F 9/3869 712/220 |
| 2007/0038984 A1 | 2/2007 | Gschwind et al. |
| 2007/0260856 A1 | 11/2007 | Tran et al. |
| 2011/0099354 A1 | 4/2011 | Takashima et al. |
| 2011/0320765 A1 | 12/2011 | Karkhanis et al. |
| 2012/0047352 A1 | 2/2012 | Yamana |
| 2013/0151816 A1 | 6/2013 | Indukuru et al. |
| 2013/0297912 A1 | 11/2013 | Tran et al. |
| 2013/0346985 A1 | 12/2013 | Nightingale |
| 2014/0059328 A1 | 2/2014 | Gonion |
| 2014/0082626 A1 | 3/2014 | Busaba et al. |
| 2015/0026435 A1 | 1/2015 | Muff et al. |
| 2015/0212972 A1 | 7/2015 | Boettcher et al. |
| 2015/0227369 A1 | 8/2015 | Gonion |
| 2016/0092238 A1 | 3/2016 | Codrescu et al. |
| 2016/0275043 A1 | 9/2016 | Grochowski et al. |
| 2016/0371091 A1 | 12/2016 | Brownscheidle et al. |
| 2017/0177354 A1 | 6/2017 | Ould-Ahmed-Vall |
| 2017/0357513 A1 | 12/2017 | Ayub et al. |
| 2018/0181400 A1 | 6/2018 | Scherbinin et al. |
| 2018/0196678 A1 | 7/2018 | Thompto |
| 2018/0253310 A1 | 9/2018 | Stephens |
| 2019/0079764 A1 | 3/2019 | Diamond et al. |
| 2019/0243646 A1 | 8/2019 | Anderson |
| 2020/0004534 A1 | 1/2020 | Gurram et al. |
| 2020/0004543 A1 | 1/2020 | Kumar et al. |
| 2020/0319885 A1 | 10/2020 | Eyole et al. |
| 2020/0387382 A1 | 12/2020 | Tseng et al. |
| 2021/0026639 A1 | 1/2021 | Tekmen et al. |
| 2021/0311743 A1 | 10/2021 | Tran |
| 2021/0326141 A1 | 10/2021 | Tran |
| 2023/0068637 A1 | 3/2023 | Feiste et al. |
| 2023/0244490 A1 | 8/2023 | Tran |
| 2023/0244491 A1 | 8/2023 | Tran |

FOREIGN PATENT DOCUMENTS

| | | |
|---|---|---|
| EP | 0959575 A1 | 11/1999 |
| WO | 0010076 A1 | 2/2000 |
| WO | 0208894 A1 | 1/2002 |
| WO | 0213005 A1 | 2/2002 |

OTHER PUBLICATIONS

U.S. Pat. Appl. No. 17/672,622, filed on Feb. 15, 2022, by Thang Minh Tran

Anonymous: "RISC-V—Wikipedia", Apr. 16, 2022 (Apr. 16, 2022), XP093142703, Retrieved from the Internet: URL:https://en.wikipedia.org/w/index.php?title=RISC-V&oldid=1083030760 [retrieved on Mar. 27, 2024].

Choi, W., Park, SJ., Dubois, M. (2009). Accurate Instruction Prescheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

PCT/US2023/018970, International Preliminary Report on Patentability, Jul. 18, 2024.

PCT/US2023/018996, International Preliminary Report on Patentability, Jul. 19, 2024.

PCT/US2023/018996, Written Opinion of the International Preliminary Examining Authority, Apr. 8, 2024.

PCT/US2023/027497 Written Opinion of the International Searching Authority, Oct. 13, 2023.

PCTUS2023081682, Written Opinion of the International Searching Authority, Mar. 22, 2024.

Written Opinion of The International Preliminary Examining Authority, PCTUS2023/018970, Mar. 25, 2024.

Written Opinion of the International Searching Authority, PCT/S2022/052185, Apr. 3, 2023.

Written Opinion of the International Searching Authority, PCT/US2023/018970, Jun. 28, 2023.

Written Opinion of the International Searching Authority, PCT/US2023/018996, Jul. 3, 2023.

* cited by examiner

Write Control (64)

| Time | V | Reg |
|---|---|---|
| 63 | 0 | x0 |
| 62 | 0 | x0 |
| . | 1 | x25 |
| . | 1 | x14 |
| 28 | 1 | x22 |
| 27 | 1 | x9 |
| 26 | 1 | x5 |
| . | 0 | x0 |
| 2 | 0 | x0 |
| 1 | 0 | x0 |
| 0 | 0 | x0 | time count → 26

FIG. 4B

Read Control (62)

| Time | V | Reg |
|---|---|---|
| 63 | 0 | x0 |
| 62 | 0 | x0 |
| . | 1 | x27 |
| . | 1 | x11 |
| 27 | 1 | x7 |
| 26 | 1 | x27 |
| 25 | 1 | x5 |
| . | 0 | x0 |
| 2 | 0 | x0 |
| 1 | 0 | x0 |
| 0 | 0 | x0 | time count → 25

MICROPROCESSOR WITH A TIME COUNTER FOR STATICALLY DISPATCHING EXTENDED INSTRUCTIONS

RELATED APPLICATIONS

This application is related to the following U.S. patent applications which are both hereby incorporated by reference in their entirety: U.S. patent application Ser. No. 17/588,315, filed Jan. 30, 2022, and entitled "Microprocessor with Time Counter for Statically Dispatching Instructions" and U.S. patent application Ser. No. 17/672,622, filed Feb. 15, 2022, and entitled "Register Scoreboard for A Microprocessor with a Time Counter for Statically Dispatching Instructions."

TECHNICAL FIELD

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

TECHNICAL BACKGROUND

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from reservation stations or central windows. Designing an OOO superscalar microprocessor is a huge undertaking. Hundreds of different instructions can be issued to the execution pipeline where the data dependencies must be resolved and arbitrated for execution by a large number of functional units. The result data from the functional units must be again arbitrated for the write buses to write back results to the register file. If the data cannot be written back to the register file, then the result data are kept in temporary registers and a complicated stalling procedure needs to be performed for the execution pipeline. The number of instructions issuing per clock cycle reaches saturation where issuing more instructions per clock cycle is more costly in area and power than the increase in performance.

Many commercially available processors have extended instruction sets. The new instruction set is built alongside the baseline instruction set and enables communication and execution with other processors such as floating point units, signal processing units, specialized graphics processors, etc. The baseline instruction set is "extended" to improve performance of various specialized applications. The extended instructions sometimes include requirements for additional register files and additional functional units in the execution pipeline. Unfortunately, as registers and functional units are added to the execution pipeline, the complexity of this traditional approach increases dramatically in both the finished design and in the design process.

Thus, there is a need for a superscalar microprocessor which can be efficiently configurable to extend the instruction set, consume less power, has a simpler design, and is scalable with consistently high performance.

SUMMARY

The disclosed embodiments provide a register scoreboard for a processor with a time counter and a method of using the register scoreboard for statically dispatching instructions to an execution pipeline with preset execution times based on a time count from the time counter. The time counter provides a time count representing a specified time of the processor and is incremented periodically. An instruction issue unit is coupled to the time counter and receives all instructions, including extended instructions. The extended instructions described herein are instructions that are specially implemented in a processor in addition to a baseline instruction set of a particular architecture implemented by the processor. For example, a baseline processor for many applications may not include the capability of executing floating point arithmetic calculations. In a particular application where floating point calculations are desired, an external floating point functional unit may be provided off chip from the processor, or the floating point unit may be added to the processor chip.

As employed herein, the term "baseline instruction" or "baseline instructions" refers to the instruction(s) that is/are part of an instruction set implemented by a processor in order to be architecturally compatible with an instruction set. The baseline instructions are the instructions required to be implemented in order for a processor to be compatible with a particular computer architecture. Certain architectures, such as for example, the RISC V architecture, specify certain instructions, referred to herein as "standard extended instruction(s)" that are defined by certain opcodes but that are not required to be implemented by a processor to be compatible to the architecture. These standard extended instructions, while not required to be implemented, are similar to baseline instructions in that each standard extended instruction corresponds to an opcode defined in the architecture. To be architecturally compatible, a processor that implements a particular standard extended instruction must respond by performing a predefined function or operation when presented with a predefined opcode. An example of a standard extended instruction may be a floating-point operation that can be used to improve performance of certain applications.

Certain architectures, such as for example, the RISC V architecture, specify certain instructions, referred to herein as "custom extended instruction(s)" that are defined by certain reserved opcodes. As with standard extended instructions, custom extended instructions are not required to be implemented by a processor to be architecturally compatible with a particular instruction set. However, unlike a standard extended instruction, a custom extended instruction does not have a predefined function or operation associated with a particular opcode. Instead, a custom extended instruction in any particular processor implementation may perform a function specific to that particular processor. The term "extended instruction(s)" as used herein refers collectively to "standard extended instruction(s)" and "custom extended instruction(s)."

In disclosed embodiments, an execution queue receives the time count and receives the baseline and extended instructions, then dispatches the instructions, to an appropriate functional unit when the time count reaches the preset execution time count.

A disclosed approach to microprocessor design employs static scheduling of instructions. A disclosed static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependencies, (2) availability of read buses to read data from the register file, (3) availability of a functional unit to execute the instruction, and (4) availability of a write bus to write result data back to the register file. The static scheduling described herein issues both baseline and extended instructions as long as the above four conditions are met.

The four conditions above are associated with time: (1) a time when all data dependencies are resolved, (2) a time the read buses are available to read source operands from a register file, (3) a subsequent time the functional unit is available to execute the instruction, and (4) a further subsequent time the write bus is available to write result data back to the register file.

In one embodiment, a time counter increments with each clock cycle and the resulting count is used to statically schedule instruction execution. Instructions have known throughput and latency times, and thus can be scheduled for execution based on the time count. For example, an add instruction with throughput and latency time of 1 can be scheduled to execute when any data dependency is resolved. If the time count is 5 and the add has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 9. The add instruction is dispatched to the ALU execution queue with the preset execution times. The read buses, the ALU, and the write bus are scheduled to be busy at the preset times. The maximum time count is designed to accommodate the largest future time to schedule execution of instruction. For example, in some embodiments, the time count is 64 and no instruction can be scheduled to execute more than 64 cycles in the future.

By way of example, the RISC-V instruction set architecture sets aside instruction opcodes for extending the instruction set which includes custom extended instructions and standard extended instructions such as floating-point, digital signal, and vector processing instructions. The extended instructions may require both extended register files and/or special purpose functional units. Depending on the application, a microprocessor may be configured to include either or both the custom and extended instructions.

In one embodiment, register files for both the custom instructions and the extended instructions are incorporated into a single larger physical register file implemented with the benefit of a register renaming algorithm. In the register renaming algorithm, data dependencies are resolved for all registers and the static scheduling is applied to all instructions regardless of the instruction type. With static scheduling of instructions based on the time count, the instructions are issued and executed, the complexity of dynamic scheduling is eliminated, and the hundreds of comparators for data dependencies are eliminated. The out-of-order execution of both custom and extended instructions is the same as in a baseline out of order execution processor making static scheduling of instructions with a time count more efficient.

The elimination of the extra components means the processor consumes less power. Instructions are efficiently executed out-of-order with preset times to retain the performance compared to traditional dynamic approaches. The number of issued instructions is scalable from scalar to superscalar.

BRIEF DESCRIPTION OF THE DRAWINGS

Aspects of the present invention are best understood from the following description when read with the accompanying figures.

DETAILED DESCRIPTION

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment, a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

Figure 1:
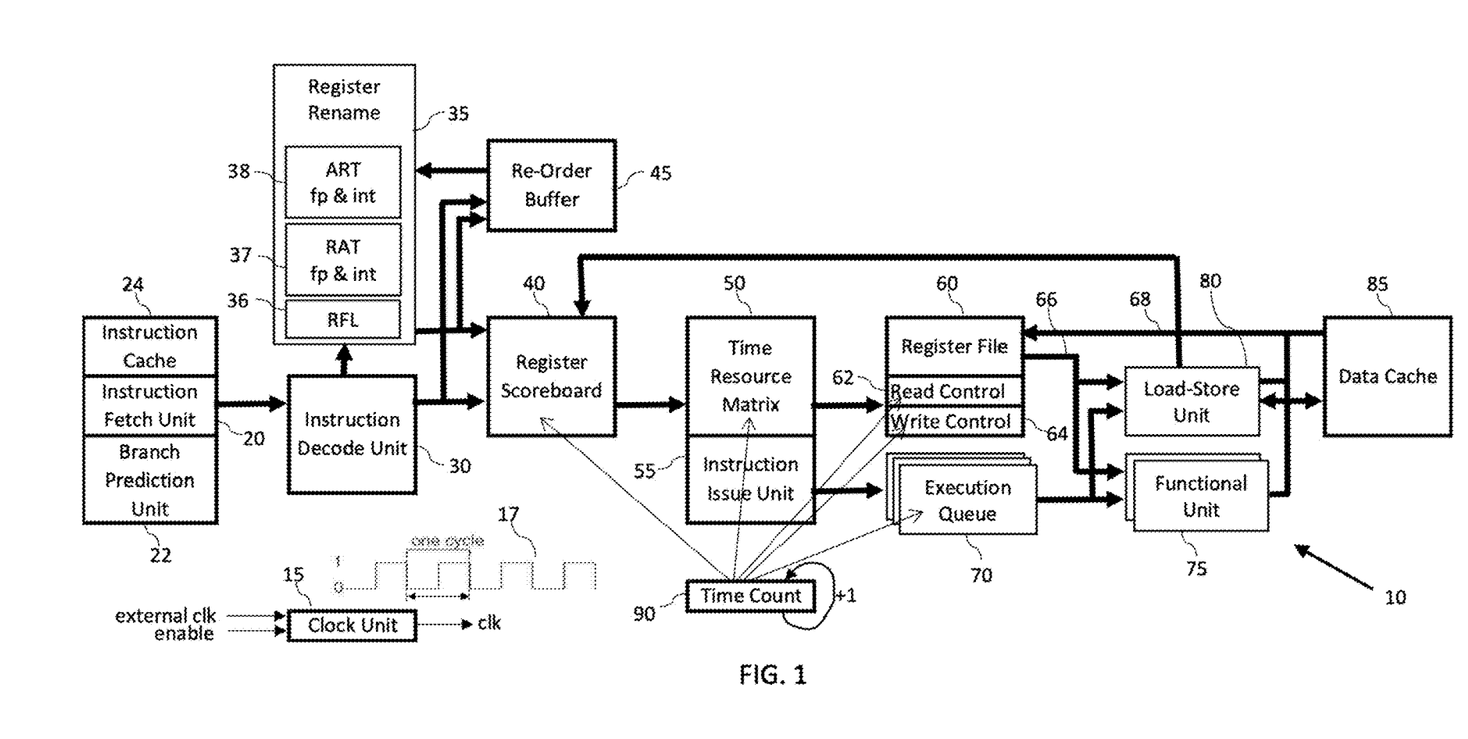
FIG. 1 is a block diagram illustrating a processor based data processing system in accordance with a preferred embodiment of the present invention.

FIG. 1 is a block diagram of a microprocessor based data processing system. The exemplary system includes a microprocessor 10 having a clock unit 15, an instruction fetch unit 20, an instruction cache 24, a branch prediction unit 22, an instruction decode unit 30, a register renaming unit 35, a register scoreboard 40, re-order buffers 45, a time-resource matrix 50, an instruction issue unit 55, a register file 60, a read control unit 62, a write control unit 64, a plurality of execution queues 70, a plurality of functional units 75, a load-store unit 80, and a data cache 85. The microprocessor 10 includes a plurality of read buses 66 connecting the register files to the functional units 75 and load-store unit 80. The system also includes a plurality of write buses 68 to write result data from the functional unit 75, the load-store unit 80, and the data cache 85 to the register file 60. The re-order buffer 45 is used to track the order of the instructions as they are decoded in order from the instruction decode unit 30. Microprocessor 10 is a synchronous microprocessor where the clock unit generates a clock signal ("elk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronization of the many different units and states in the microprocessor 10. The clock signal is used to sequence data and instructions through the units that perform the various computations in the microprocessor 10. The clock unit 15 may include an external clock as input to synchronize the microprocessor 10 with external units (not shown). The clock unit 15 may further include an enable signal to disable the clock unit when the microprocessor is in idle stage or not being used for instruction execution.

According to an embodiment the microprocessor 10 also includes a time counter unit 90 which stores a time count incremented, in one embodiment, every clock cycle. The time counter unit 90 is coupled to the clock unit 15 and uses the "clk" signal to increment the time count.

In one embodiment the time count represents the time in clock cycles when an instruction in the instruction issue unit 55 is scheduled for execution. For example, if the current time count is 5 and an instruction is scheduled to be execute later in 22 cycles, then the instruction is sent to the execution queue 70 with the execution time count of 27. When the time count increments to 26, the execution queue 70 issues the instruction to the functional unit 75 for execution in the next cycle (time count 27). The time counter unit 90 is coupled to the register scoreboard 40, the time-resource matrix 50, the read control 62, the write control 64, and the plurality of execution queues 70.

The scoreboard 40 resolves data dependencies in the instructions. The time-resource matrix 50 checks availability of the various resources, which in one embodiment include the read buses 66, the functional units 75, the load-store unit 80, and the write buses 68. The read control unit 62, the write control unit 64, and the execution queues 70 receive the scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time. The execution queue 70 is set to dispatch an instruction to a functional unit 75 or the load-store unit 80 at a preset time. In each case, the preset time is the time determined by the decode/issue unit 30. The preset time is a future time that is based on the time count, so when the time count counts up to the preset time, then the specified action will be performed. The specified action can be reading data from the register file, writing data to the register file, issuing an instruction to a functional unit for execution, or some other action. The decode/issue unit 30 determines when an instruction is free of data dependencies and the resource is available. This allows it to set the "preset time" for the instruction to be executed in the execution pipeline.

In the microprocessor system 10, the instruction fetch unit 20 fetches the next instruction(s) from the instruction cache 24 to send to the instruction decode unit 30. In one embodiment, the multithreaded microprocessor 10 keeps a program counter (not shown) for each thread. For each thread, the instruction fetch unit 20 fetches the next instruction(s) from the instruction cache 24 to send to the instruction decode unit 30. One or more thread bit(s) are attached to each instruction for identification of the thread to which the instruction corresponds. Different algorithms of alternating thread instructions may be used to send instructions to the instruction decode unit 30. In one embodiment, the threads use a round robin algorithm to dispatch a number of instructions of one thread per cycle from the instruction fetch unit 20 to the instruction decode unit 30. The number of instructions per cycle can vary and is dependent on the number of instructions per cycle supported by the processor. In one embodiment, the thread re-order buffer 45 may send a signal to stall sending instructions for a particular thread. One or more instructions can be fetched per clock cycle by the instruction fetch unit depending on the configuration of microprocessor 10. For higher performance, microprocessor 10 fetches more instructions per clock cycle for the instruction decode unit 30. For low-power and embedded applications, microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled to the branch prediction unit 22 for prediction of the next instruction address when a branch is detected and predicted by the branch prediction unit 22. The instruction fetch unit 20, the instruction cache 24, and the branch prediction unit 22 are described here for completeness. In other embodiments, other instruction fetch and branch prediction methods can be used to supply instructions to the instruction decode unit 30 for microprocessor 10.

The instruction decode unit 30 is coupled to the instruction fetch unit 20 for new instructions and also coupled to the register renaming unit 35 and the register scoreboard 40. The instruction decode unit 30 decodes the instructions for instruction type, instruction throughput and latency tunes, and the register operands. In an embodiment, the instruction decode unit 30 decodes extended instructions in addition to the baseline instructions. The register operands, for example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution.

Other data dependencies for the instructions include the write-after-write (WAW) and write-after-read (WAR). The WAW data dependency occurs when 2 instructions write back to the same destination register. The WAW dependency restricts the later instruction from writing back to the same destination register before the earlier instruction is written to it. To address the WAW dependency, every destination register is renamed by the register renaming unit 35 where the later instruction is written to a different register from the earlier register, thus eliminating the WAW data dependency. For example, if three instructions have the same destination register R5, and which are renamed to R37, R68, R74 then the three instructions can write to the destination register at any time. Without renaming, all three instructions will try to write to the same register R5 which is a WAW dependency in that the third instruction cannot write to R5 before the second instruction, which cannot write to R5 before the first instruction.

The register renaming unit 35 also eliminates the WAR data dependency where the later instruction cannot write to a register until the earlier instruction reads the same register. Since the destination register of the later instruction is renamed, the earlier instruction can read the register at any time. In such an embodiment, as the destination registers are renamed, the instructions are executed out-of-order and written back to the renamed destination register out-of-order. The register scoreboard 40 is used to keep track of the completion time of all destination registers. In a preferred embodiment the completion time is maintained in reference to the time count 90.

In one embodiment, the register renaming unit 35 consists of a register free list (RFL) 36, a register alias table (RAT) 37, and an architectural register table (ART) 38. The RAT 37 and the ART 38 include the integer registers as defined by the baseline instructions, the custom registers, the floating-point registers for the floating-point instructions, and any extended registers for any extended instructions. Here we describe implementation of floating-point instructions as an extension to the baseline instructions as one example for any or a combination of different extended instruction types.

In one embodiment, the baseline instructions are integer instructions with 32-entry baseline registers and the floating-point instructions have 32-entry floating-point extended registers. There are also 64 temporary registers for renaming. This provides a total of 128 physical registers, collectively referred to as the register file 60. In one embodiment, the integer and floating-point registers have the same data width. In an embodiment where the data width of floating-point registers is smaller than the data width of the integer registers, then the upper bits of the register file 60 are not used when the registers are the floating-point registers. The combined baseline and extended registers are mapped into the physical register file 60 which the issue and execute pipelines of the microprocessor 10 use to execute instructions based on the registers in register file 60 without need for reference to the integer or floating-point registers. In the above-described embodiment, register scoreboard 40 keeps the write back time for the 128 physical registers. The register scoreboard 40 is associated with the physical register file 60. The RFL 36 keeps track of temporary registers (64 registers in this example) which have not been used. As the destination register of an instruction is renamed, a free-list register is used for renaming. The RAT 37 stores the latest renamed registers of the architectural registers. For example, if register R5 is renamed to the temporary register R52, then the RAT 37 keeps the renaming of R5 to R52. Thus, any source operand which references to R5 will see R52 instead of R5. As the architectural register R5 is renamed to R52, eventually when register R52 is retired, the architectural register R5 becomes R52 as stored in the ART 38. The RAT 37 keeps track of the architectural register renaming for both integer and floating-point registers will eventually retire to the ART 38. The register scoreboard 40 indicates the earliest time for availability of a source register of the register file 60, independently of register type.

In one embodiment, if instructions are executed out-of-order, then the re-order buffer 45 is needed to ensure correct program execution. The register renaming 35 and the instruction decode unit 30 are coupled to the re-order buffer 45 to provide the order of issued instructions and the latest renaming of all architectural registers. The re-order buffer 45 is needed to retire the instructions in order regardless of when the instructions are executed and written back to the register file 60. In one embodiment, re-order buffer 45 takes the form of a first in first out (FIFO) buffer. Inputs are instructions from the decode unit 30 and instructions are retired in order after completion by the functional unit 75 or the load store unit 80. In particular, the re-order buffer 45 flushes all instructions after a branch misprediction or instruction exception. The ART 38 is updated only with the instructions before a branch misprediction or instruction exception. Another function of the re-order buffer 45 is writing data to memory only in accordance with the order of the load and store execution. The data memory (including data cache 85 and external memory) should be written in order by retiring of the store instructions from the re-order buffer 45. Retiring of store instructions is performed in order for each thread, so the store buffer (not shown) in the load store unit 80 is duplicated for each thread.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes to which each component is connected. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may, be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and include instructions for causing the computer system to execute a method. The aforementioned program nodules and/or code segments may be executed on suitable computing system to perform the functions disclosed herein. Such a computing system will typically include one or more processing units, memory and non-transitory storage to execute computer-executable instructions.

Figure 2:
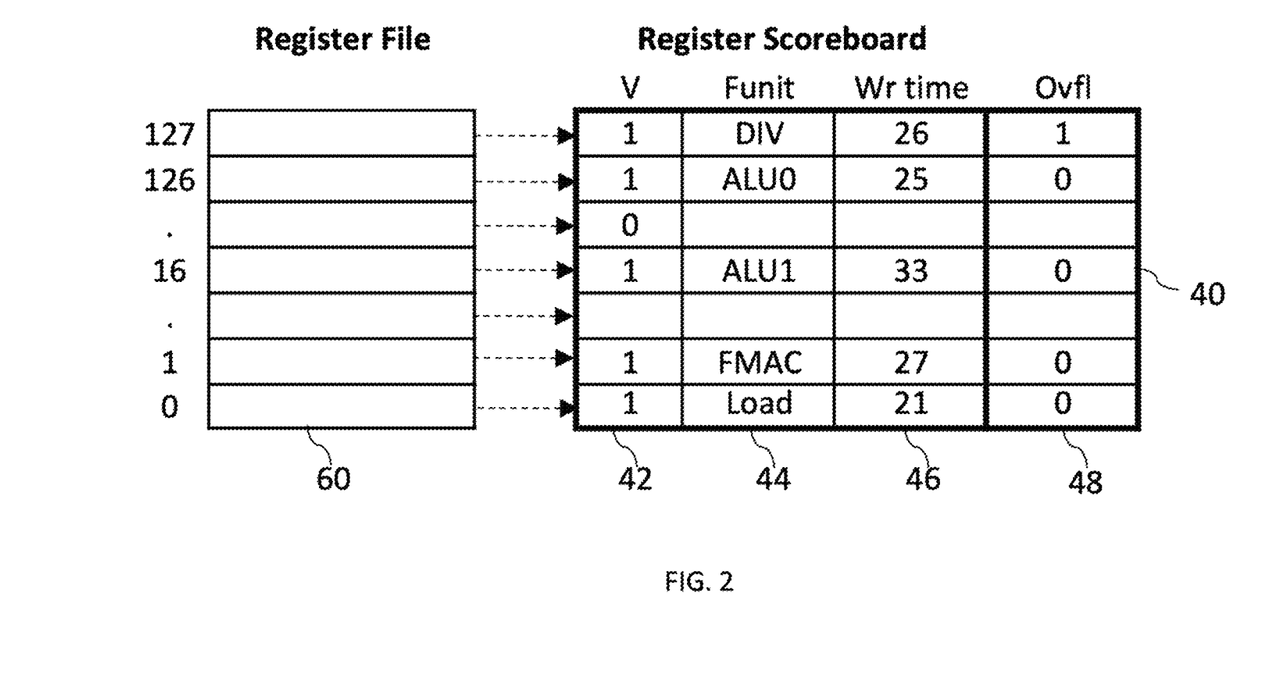
FIG. 2 is a block diagram illustrating a register file and a register scoreboard.

FIG. 2 illustrates further details of the register file 60 and the register scoreboard 40. In one embodiment, the register file 60 has 128 registers, numbered as registers 0 to 127 as illustrated. The register file 60 consists of all physical registers of the processor 10. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44. As examples, illustrated in FIG. 2, register 0 is written back at time count 21 from the load-store unit 80. Register 1 is written back at time count 27 from the floating-point multiply-accumulate (FMAC) unit (one of the functional units 75). Register 16 is written back at time count 33 from the ALU1, (another of the functional units 75), etc. The write time 46 is the time in reference to the time count 90. The result data is written to the register file 60. The data is not available from the register file 60 until the next clock cycle, but the result data can be forwarded from the corresponding functional unit 44 in the register scoreboard 40. For example, if the value of the time count 90 is 19, then the load-store unit 80 produces the result data in 2 clock cycles at time count 21 for writing back to the register file 60. In one embodiment, the "Funit" field 44 is 5 bits which accommodate 32 different functional units 75 and load/store ports to data cache 85. The number bits for "Funit" field 44 is configurable for addition of baseline, custom, and extended functional units.

The write back time from the functional unit is based on the known latency time of an instruction. The latency time of a load instruction is not fixed. The latency time of a load instruction can be unpredictable as the load data may not be in the data cache 85. For a data cache miss, the data must be fetched from external memory as described above. In such a situation, the write back time in the scoreboard 40 for the destination register of a load instruction will no longer be correct. If processor 10 is implemented with a level 2 cache (not shown), then the latency time for a level 2 cache hit can be used to update the register scoreboard 40.

The write time of a destination register is the read time for the subsequent instruction with RAW data dependency on the same destination register. Referring back to FIG. 1, the source registers of an instruction in the instruction decode unit 30 access the register scoreboard 40 for the corresponding read times. If the valid bit 42 of a source register is not set in the register scoreboard 40, then the data in the register file 60 can be accessed at any time, providing availability of the read buses 66, otherwise the write time 46 is the earliest time to issue the instruction. The write time 46 is when the result data from the functional unit 75 or the load store unit 80 are on the write bus 68 to the register file 60. The result data from write bus 68 can be forwarded to read bus 66 so that the result data is available on the read bus 66 in the same clock cycle in which it is written to the register file 60. In one embodiment, the "Funit" field 44 indicates which functional unit will write back to the register file 60, and the designated functional unit can restrict the aforementioned forwarding to the read bus 66 due to the presence of a critical timing path. For example, the data from the data cache is a critical timing path in which case forwarding is performed, in one embodiment, to only the ALUs. If the issued instruction is multiply, then the write time 46 from load store unit 80 should be incremented by 1 to be used as the read time for the multiply instruction. In such an instance, the multiply instruction reads the data from the register file 60 one cycle after the load data is written to the register file 60. Forwarding of data from the data cache 85 to the ALU is normal and is the same as forwarding of any functional unit to any functional unit, while forwarding of data from data cache 85 to multiply unit is not allowed. As an example, when the ALU instruction reads the register 0 of the register scoreboard 40 in FIG. 2, the write time 46 of 21 is used as the read time as data can be forwarded from the data cache 85 onto read bus 66. When the multiply instruction reads the same register 0 of the register scoreboard 40 in FIG. 2, the read time of 22 is used to read data from the register file 60 as the data from data cache 85 are written into the register file 60 in cycle 21. This same restriction is kept and does not permit the read control unit 62 to forward the load data from the data cache 85 to the multiply unit.

An instruction reads source operand data at read time, executes the instruction with a functional unit 75 at execute time, and writes the result data back to the register file 60 at write time. The write time is recorded in the write time field 46 of the register scoreboard 40. With 2 source registers, a given instruction selects the later write time, of the two source registers, from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 3 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write times of an instruction access the time-resource matrix 50 to determine availability of the resources.

Figure 3:
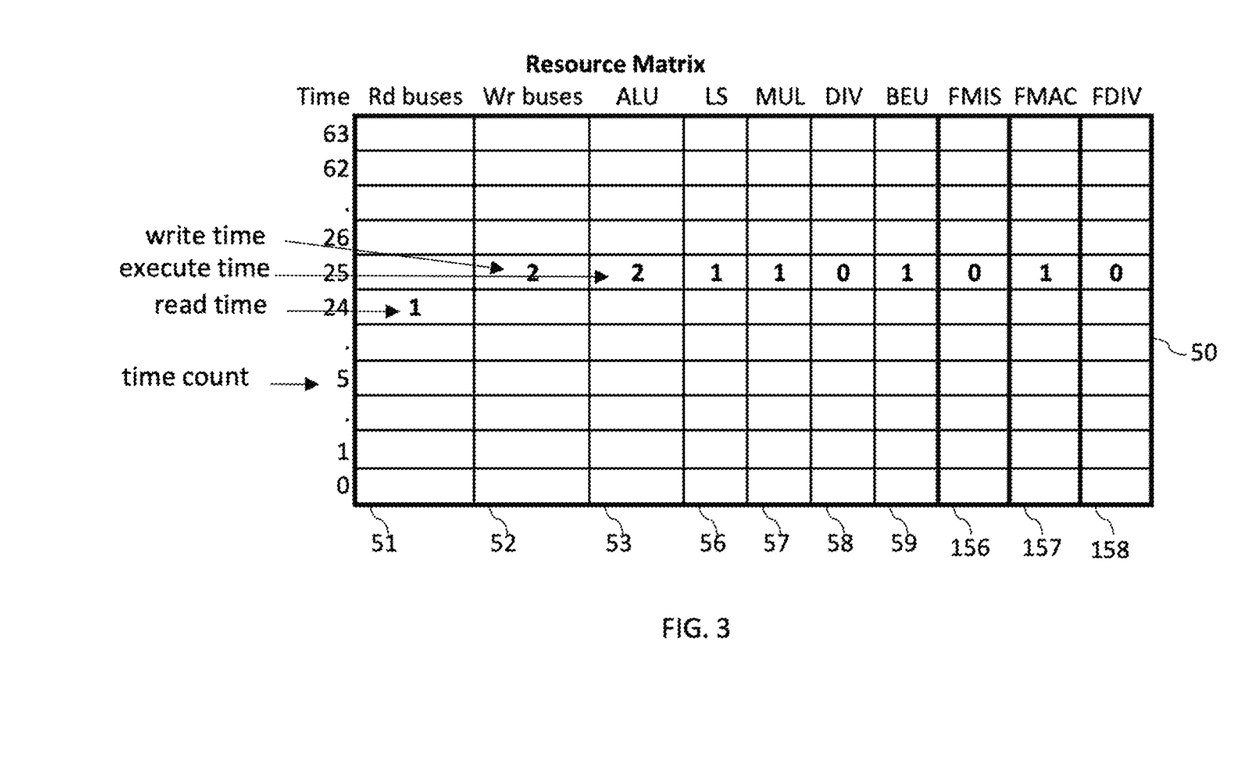
FIG. 3 is a block diagram illustrating a time-resource matrix.

FIG. 3 illustrates further details of the time-resource matrix 50. The time-resource matrix 50 preferably includes the same number of time entries to match the time counter 90. For example, if the time counter 90 is 64 cycles, then the time-resource matrix 50 has 64 entries. In one embodiment, the time counter is incremented every clock cycle and rotates back from the 63rd entry to the 0th entry. The columns in the time-resource matrix 50 represent the available resources for the read buses 51, the write buses 52, the ALUs 53, the load-store ports 56, the multiply unit 57, the divide unit 58, the branch execution unit (BEU) 59, the floating-point miscellaneous (FMIS) unit 156, the floating-point multiply and accumulate (FMAC) unit 157, and the floating-point divide (FDIV) unit 158. If other custom functional units are provided by microprocessor 10 those are also included in the time-resource matrix 50 with each custom functional unit being assigned a separate column.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, the branch execution unit column 59, the floating-point miscellaneous column 156, the floating-point multiply and accumulate column 157, and the floating-point divide column 158 correspond to the plurality of functional units 75 of FIG. 1. The load-port ports column 56 corresponds to the load-store unit 80 of FIG. 1. In one embodiment, the multiply unit 57, the divide unit 58, the FMIS unit 156, the FMAC unit 157, and the FDIV unit 158 are single functional units in which case the columns of the time-resource matrix 50 can be duplicated to add additional functional units. A particular benefit of employing the static scheduling of instructions disclosed herein the ease with which additional functional units can be added during the design of a microprocessor. During development at the RTL level, the duplication of the columns of the time-resource matrix 50 can be done by a software script especially duplicating the additional floating-point resources, 156-158 from the multiply unit 57.

FIG. 3 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, there is 1 available read bus, and at execution time 25, there are 2 available ALUs, 1 load-store port, 1 multiply unit, 1 BEU, and 1 FMAC unit for execution of an instruction. At write time 25, there are 2 available write buses.

All available resources for a required time are read from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to correspondingly reduce the available resource values. All resources must be available at the required time counts for the instruction to be dispatched to the execution queue 70. If all resources are not available, then the required time counts are incremented by one, and the time-resource matrix is checked as soon as the same cycle or next cycle. The particular number of read buses 66, write buses 68, and functional units 75 in FIG. 1 is preferably chosen to minimize stalling of instructions in the instruction issue unit 55.

Figure 4A:
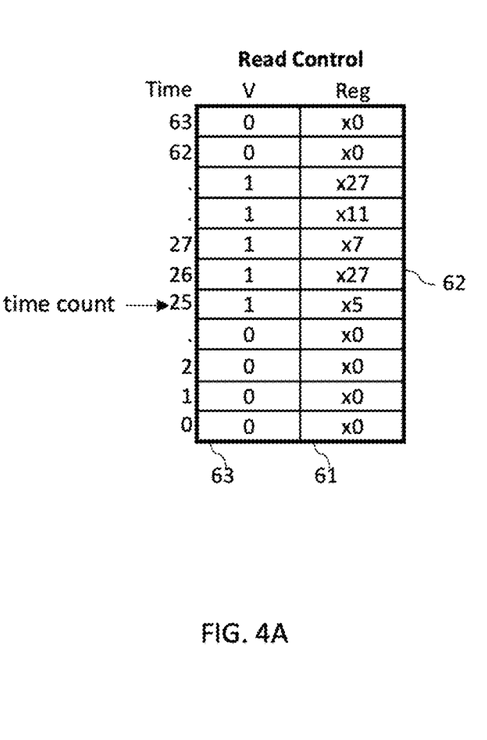
FIG. 4A and FIG. 4B are block diagrams illustrating a read bus control and a write bus control.
Figure 4B:
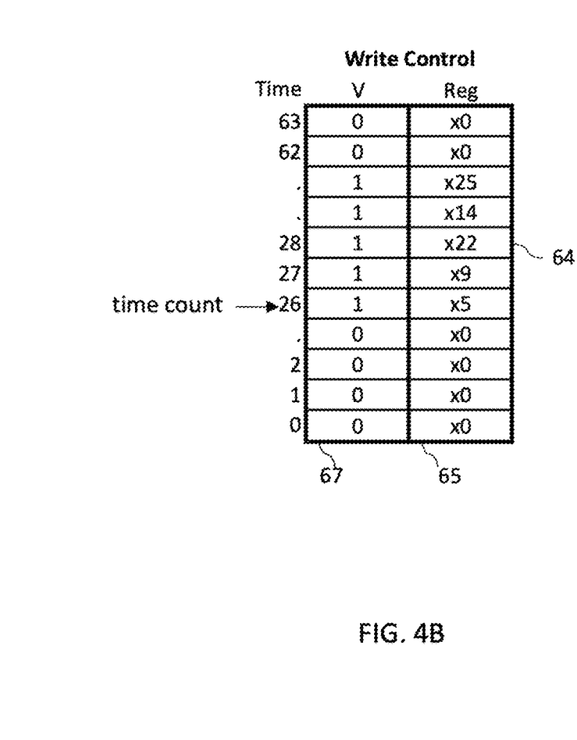

FIG. 4A illustrates a single read bus of the read control unit 62 and FIG. 4B illustrates a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represent the source register 61 and a valid bit 63. The columns in the write control unit 64 represent the destination register 65 and a valid bit 67 in the write bus 65.

In the example illustrated in FIGS. 4A and 4B, at the time count of 25 in the read control unit 62 the register x5 from the register field 61 of the read control 62 is used to read the entry 5 from the register scoreboard 40 for the "Wr time" 46 and the "Funit" 44. If the write time 46 is the same as the time count 90, then the result data is written back to the register file 60 in the same clock cycle. The result data from the "Funit" 44 can be forwarded to the read bus 66 instead of being read from the register file 60. The write time 46 may have changed due to a cache miss of the load instruction, in which case the instruction cannot be executed yet because the source operand data is not valid. The RAW dependent instruction is rescheduled to be executed at later time. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling architectures.

Similarly in FIG. 4B, the register x5 from the register field 65 of the write control unit 64 at time count of 26 is used to write to the register file 60. The register x5 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. In one embodiment, the valid (valid bit field 67) register 65 of write control unit 64 is responsible to clear the valid bit 42 from the register scoreboard 40 of FIG. 2 if the corresponding "Wr time" field 46 is the same as the time count 90. It is possible that the write time 46 of the register scoreboard 40 has been modified due to delay in write time. An alternative is to compare time count to all "Wr time" fields 46 of the register scoreboard 40 and to clear the valid bit 42 for matching times. This alternative results in high power consumption if for example, there are 100 registers in the register scoreboard 40. The write control unit 64 operates as a centralized control for the write buses 68 which removes complexity compared to distributing such control among the plurality of functional units in dynamic scheduling.

Figure 5:
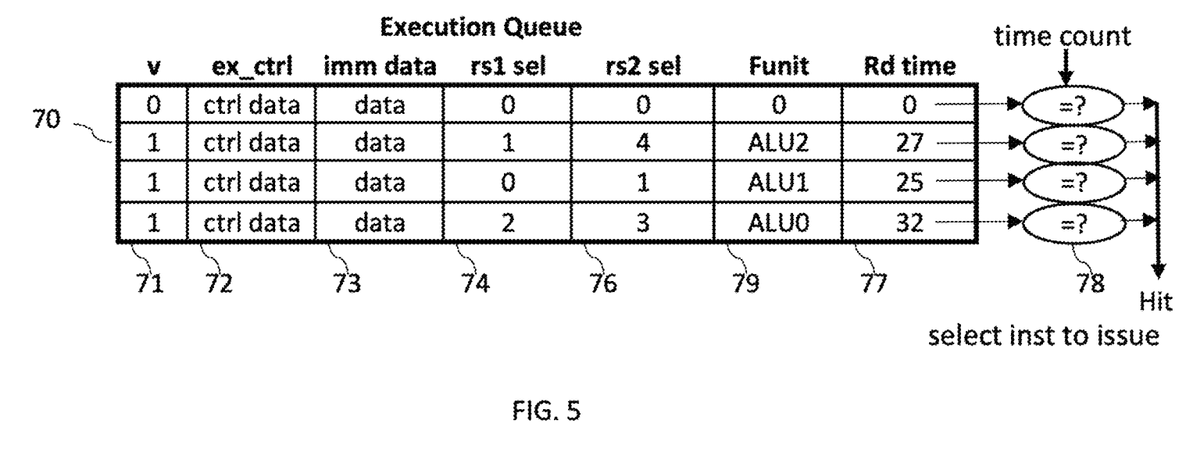
FIG. 5 is a block diagram illustrating an execution queue.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, the functional unit 79, and the read time 77. The valid bit 71, when set to "1," indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The functional unit 79 is optionally added if the execution queue 70 is coupled to multiple functional units 75 where the execution queue 70 can dispatch multiple instructions to multiple functional units 75 in the same clock cycle where comparators have multiple matches to the time count 90. The source register selects 74 and 76 may not be used for some instructions.

The read control 62 reads the register scoreboard 40 to ensure that the expected source operand data is still valid and is synchronized with the execution queue 70 to supply source data to the functional unit 75. If the write time 46 from the scoreboard 40 is modified to be greater than the time count 90, then the synchronized instruction in the execution queue 70 is replayed instead of going to the functional unit 75. In one embodiment, the replay instruction uses the new write time from the register scoreboard 40 to calculate the new read time, execution time, and write time for accessing the time resource matrix 50 to reissue the instruction. The procedure is the same as for instructions in the instruction issue unit 55.

Note that the destination register can be, but does not need to be, kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 5, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, the functional unit field 79 can be added to the execution queue 70 to indicate the functional unit number for dispatching of instructions. In one embodiment, the execution queue 70 is configurable with a single functional unit, or multiple functional units, or multiple functional units of the same type such as ALU type for multiple ALUs or floating-point type for all floating-point functional units. The execution queue 70 is duplicated for as needed for baseline or custom instructions where the functional unit field 79 stores different type of functional units. The functional units 75 may be designed with the same interface signals for coupling to the execution queue 70. In one embodiment, during development at the RTL level the execution queues 70 and functional units 75 may be duplicated and added for custom instructions by a software script.

Figure 6:
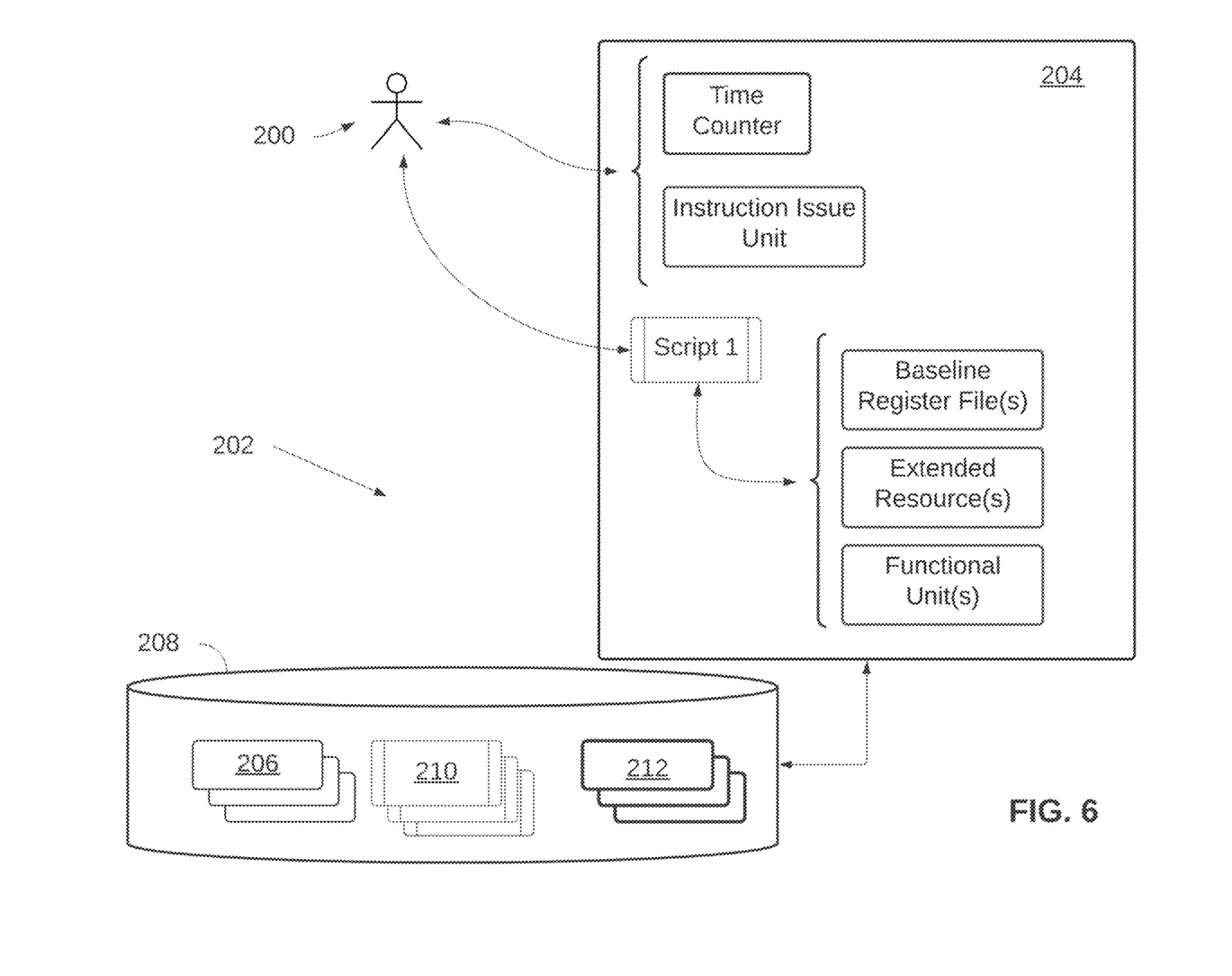
FIG. 6 is a block diagram illustrating an embodiment for generating a disclosed processor design.

FIG. 6 illustrates by way of a block diagram an embodiment that operates to facilitate generation of a design of a processor as disclosed herein that implements one or more extended instructions. In FIG. 6, a user 200 employs an electronic design automation system 202 to design a processor as disclosed herein. The system 202 provides a visual user interface 204 by which the user 200 interacts with the system 202 to specify a design of a processor. The system 202 provides to the user 200 a variety of pre-designed modules 206, specified for example in an RTL type description and stored in digital storage 208. The user 200 may select certain pre-designed modules 206 such as for example a time counter, an instruction decode unit and an instruction issue unit as described herein. Alternatively, and/or in addition, the user 200 may specify a new design of one or more of such modules for example by way of an RTL type description. In addition to selecting pre-designed modules and/or designing new modules, the system 202 provides the user 200 with the ability to select a predefined stored script 210 to generate one or more modules to, in particular, implement one or more extended instructions. As shown, user 200 has employed Script 1 to specify Baseline Architecture Register File(s), various Extended Resources and various Functional Unit(s). The scripts 210 each take the form of a set of commands, recognizable by the system 202, that execute various functions and operations performed by the system 202. The scripts 210 operate to automate manual tasks that would otherwise need to be performed by the user 200. Each design specified by user 200, or other users, is stored 212 to storage 208 for further editing and/or processing.

In one embodiment, each extended instruction is a line of code which can be added to the instruction decode code for a design by a software script 210. The extended instructions can be described by an instruction format, a list of features to define the operands, the immediate field, the extended functional unit type, the throughput and latency times which is converted to a line of code to be inserted into the instruction decode code.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. Furthermore, the invention is not limited to integer functional units. In other embodiments the functional units include floating point units, digital-signal processing units, vector processing units, or custom designed units.

The described operations of FIGS. 2-5 are the same for baseline instructions, custom instructions, or extended instructions for microprocessor 10. The static scheduling of instructions in a microprocessor with a time counter 90 simplifies the design of a microprocessor with custom and/or extended instructions. At design time at the RTL level, in some embodiments, the units related to the custom and extended instructions as shown in the block diagram of FIG. 1 can be specified using software scripts. For example, a hardware description language (seeks as Verilog) that describes the functions performed by the additions of the custom and/or extended instructions of FIG. 1 can be modified by software scripts. The register rename 35 is modified to add the floating-point registers to the RAT 37 and ART 38. The execution queues 79 and the functional units 75 may be designed to be configurable for any custom or extended instructions Which can be added to the microprocessor 10 by a software script. The software scripts are part of the software representations can be implemented employing computer-executable instructions, such as those, included in program modules and/or code segments, being executed in a computing system on a target real or virtual processor. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor that executes an instruction set comprising one or more baseline instructions and one or more extended instructions, wherein the extended instructions are optional to implementation of the instruction set, the processor comprising:
   a time counter storing a time count representing a current time of the processor, wherein the time count is incremented with each clock cycle of a clock circuit;
   an instruction issue unit coupled to the time counter for receiving a first extended instruction, and issuing the first extended instruction with a preset execution time based on the time count, wherein the first extended instruction is referenced by an opcode reserved in the instruction set for an extended instruction; and
   an execution queue coupled to the time counter and the instruction issue unit to receive the first extended instruction from the instruction issue unit and dispatch the first extended instruction to a functional unit based upon the time count.

2. The processor of claim 1 wherein the first extended instruction is referenced by a first predefined opcode that causes the processor to perform an operation defined by the instruction set.

3. The processor of claim 1 wherein the first extended instruction is referenced by a second predefined opcode that causes the processor to perform an operation that is not defined by the instruction set.

4. The processor of claim 1 further comprising a register file including:
   baseline registers for storing data used in executing baseline instructions;
   extended registers for storing data used in executing extended instructions; and
   temporary registers for storing data that cannot be written back to the register file, and for being renamed as a baseline or extended register.

5. The processor of claim 4 further comprising a register scoreboard storing a write time of a register in the register file, wherein the write time represents a future time relative to the time count, and wherein the processor includes means for renaming all baseline, extended and temporary registers and wherein the extended instructions can reference baseline registers or extended registers.

6. The processor of claim 4 wherein the extended registers have a data width no larger than the baseline registers.

7. The processor of claim 5 further comprising an instruction decode unit coupled to the register scoreboard wherein the instruction decode unit reads write times for source operands of a particular instruction from the register scoreboard, and uses the write times to determine an execution time for the particular instruction.

8. The processor of claim 7 further comprising:
   a time-resource matrix unit coupled to the register scoreboard and the time counter for storing information relating to available resources for at least some time counts of the N-bit time counter;
   wherein the available resources include at least one of: a plurality of read buses, a plurality of write buses, and a plurality of functional units; and
   wherein the instruction issue unit is coupled to the time resource matrix unit to receive data therefrom and to issue an instruction if all the resources indicated by the time-resource matrix are available, and to stall the instruction if any of the resources is not available.

9. The processor of claim 8 wherein the plurality of functional units includes a plurality of extended functional units, each performing a function not specified by any baseline instruction.

10. The processor of claim 9 further comprising:
    a read control unit storing a pointer entry to a first register in the register file that contains time count entries;
    for each pointer entry in the register file stored therein by the read control unit storing a forwarding valid bit to indicate when the corresponding entry may be read and transported on one of the plurality of read buses; and
    a write control unit storing a pointer entry to a second register in the register file with time count entries to indicate when result data are transported from one of the plurality of write buses and written to a register of the register file.

11. The processor of claim 10 wherein the execution queue stores a plurality of instructions, and wherein each of the instructions includes a read time which is a future time relative to the time count and wherein the execution queue dispatches instructions to at least one functional unit.

12. The processor of claim 11 wherein the read control unit is synchronized with the read time in the execution queue.

13. A processor that executes an instruction set comprising one or more baseline instructions and one or more extended instructions, wherein the extended instructions are optional to implementation of the instruction set, the processor comprising:
   a clock circuit;
   a time counter storing a time count representing a current time of the processor, wherein the time count is incremented with each cycle of the clock circuit;
   an instruction issue unit coupled to the time counter for receiving a first extended instruction, and issuing the first extended instruction with a preset execution time based on the time count, wherein the first extended instruction is referenced by an opcode reserved in the instruction set for an extended instruction;
   an execution queue coupled to the time counter and the instruction issue unit to receive the first extended instruction, and dispatch the first extended instruction to a functional unit when the time count matches the preset execution time;
   a register scoreboard storing a write time for data stored in each register in a register file, wherein the write time is a future time specified by the time count;
   an instruction decode unit coupled to the register scoreboard in which the instruction decode unit reads write times for source operands of an instruction from the register scoreboard, and uses the write times to determine an execution time for the instruction;
   a time-resource matrix coupled to the register scoreboard and the time counter for storing information relating to available resources for each time count of the time counter; and
   wherein the available resources include at least one of: a plurality of read buses, a plurality of write buses, and a plurality of functional units wherein the plurality of functional units includes a plurality of extended functional units.

14. A method for issuing an extended instruction to an execution queue in a processor to execute at a future time,
   wherein the future time represents a time based on a time count from a time counter which is incremented with each clock cycle of a clock circuit;
   wherein the processor executes an instruction set comprising one or more baseline instructions and one or more extended instructions; and
   wherein the extended instructions are optional to implementation of the instruction set.

15. The method of claim 14 wherein the time counter returns to a zero count after counting to a maximum time count value.

16. The method of claim 15 further comprising storing a write time of a first register of a register file wherein the write time represents a future time based on the time count wherein the register file includes for renaming architectural registers of all baseline and extended registers and temporary registers.

17. The method of claim 16 further comprising storing information corresponding to available resources for each time count in a time-resource matrix, wherein the resources comprise at least one of a plurality of read buses, a plurality of write buses, and a plurality of functional units wherein the plurality of functional units includes a plurality of extended functional units.

18. The method of claim 17 further comprising:
   storing a second register of the register file in a read control unit, wherein the register is read from the register file and transported on a read bus; and
   storing a register of a register file in a write control unit, wherein result data are transported from a write bus and written to the register of the register file.

19. The method of claim 14 further comprising storing a plurality of instructions in an execution queue wherein each instruction includes a read time based specified by the time count.

20. The method of claim 19 further comprising synchronizing the read time of the execution queue with a read control unit.

21. The method of claim 19, wherein the execution queue dispatches instructions to one of a plurality of functional units.

22. The method of claim 21 wherein the first extended instruction is referenced by a first predefined opcode that causes the processor to perform an operation defined by the instruction set.

23. The method of claim 21 wherein the first extended instruction is referenced by a second predefined opcode that causes the processor to perform an operation that is not defined by the instruction set.

24. A computer-implemented method, executable by an electronic design automation system, for generating a processor design that executes an instruction set comprising one or more baseline instructions and one or more extended instructions, wherein the extended instructions are optional to implementation of the instruction set, the method comprising:
   accepting by way of a user interface, inputs from a user that specify one or more modules that include one or more of,
      a time counter storing a time count representing a current time of the processor, wherein the time count is incremented with each clock cycle of a clock circuit;
      an instruction decode unit that decodes a baseline instruction set;
      an instruction issue unit coupled to the time counter for receiving a first extended instruction, and issuing the first extended instruction with a preset execution time based on the time count, wherein the first extended instruction is referenced by an opcode reserved in the instruction set for an extended instruction;
   associating each of the modules specified by the user with the processor design;
   executing one or more software scripts specified by the user, wherein each of the scripts takes the form of a set of commands, recognizable by the electronic design automation system, each of the commands executing a function performed by the electronic design automation system, each of the software scripts generating one or more of:
      one or more architecture register files for the extended instructions;
      one or more custom resources for a time-resource matrix;
      the instruction issue unit coupled to the time counter and the time-resource matrix to receive the first extended instruction based on availabilities of the extended resources to dispatch instructions to an execution queue;

one or more functional units; and the execution queue coupled to the time counter and the instruction issue unit to receive the first extended instruction from the instruction issue unit and dispatch the first extended instruction to a selected one or more of the functional units based upon the time count;

wherein the software script operates to extend the instruction decode unit to decode the extended instructions;

associating output of each executed software script with the processor design; and storing the processor design to storage.

* * * * *